United States Patent
Orcutt

(10) Patent No.: US 7,302,714 B2
(45) Date of Patent: Dec. 4, 2007

(54) NON-OVERFLOW TOILET BOWL SYSTEM

(75) Inventor: Ronald Orcutt, Easton, PA (US)

(73) Assignee: Ronald E. Orcutt, Easton, PA (US)

( * ) Notice: Subject to any disclaimer, the term of this patent is extended or adjusted under 35 U.S.C. 154(b) by 295 days.

(21) Appl. No.: 11/180,901

(22) Filed: Jul. 13, 2005

(65) Prior Publication Data
US 2006/0059612 A1   Mar. 23, 2006

Related U.S. Application Data

(60) Provisional application No. 60/587,629, filed on Jul. 13, 2004.

(51) Int. Cl.
*E03D 11/02* (2006.01)
(52) U.S. Cl. ......................................... 4/427
(58) Field of Classification Search ................. 4/420, 4/427
See application file for complete search history.

(56) References Cited

U.S. PATENT DOCUMENTS

| | | | |
|---|---|---|---|
| 3,262,132 A * | 7/1966 | Mann | ............... 4/427 |
| 4,011,604 A | 3/1977 | Goldsworthy | |
| 5,678,252 A | 10/1997 | Ball | |
| 6,178,569 B1 | 1/2001 | Quintana | |
| 6,385,788 B1 | 5/2002 | Wasielewski | |
| 6,671,893 B1 | 1/2004 | Quintana | |
| 6,671,894 B1 | 1/2004 | Sigrist | |
| 6,944,892 B1 * | 9/2005 | Giolas | ............... 4/427 |
| 2003/0196258 A1 | 10/2003 | Pham et al. | |

* cited by examiner

*Primary Examiner*—Huyen Le

(57) ABSTRACT

A toilet enhancement which utilizes four drain ports and a float to prevent a toilet from overflowing. As water raises, the float rises allowing water to drain into return ports and not over the top of the toilet. The ports are molded into the toilet bowl which would drain directly back to the main toilet line, therefore stopping water from flowing over the top of the toilet.

3 Claims, 5 Drawing Sheets

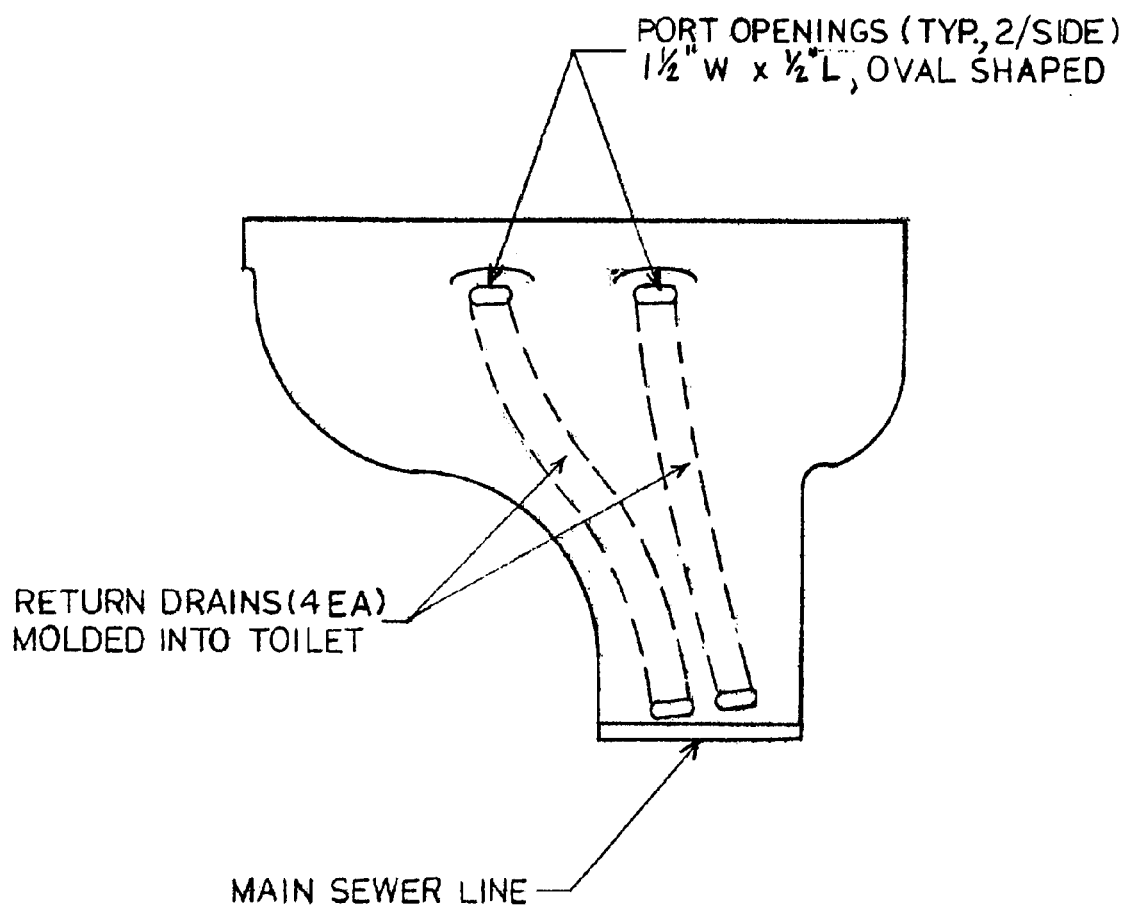

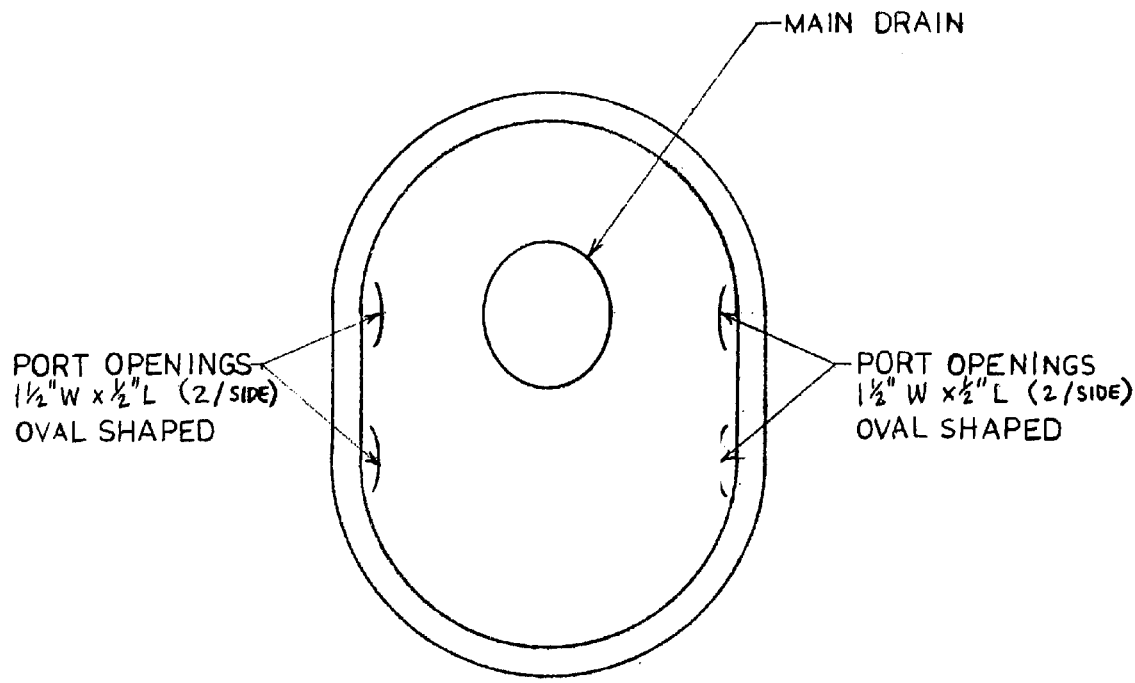

Front View (Figure 3)
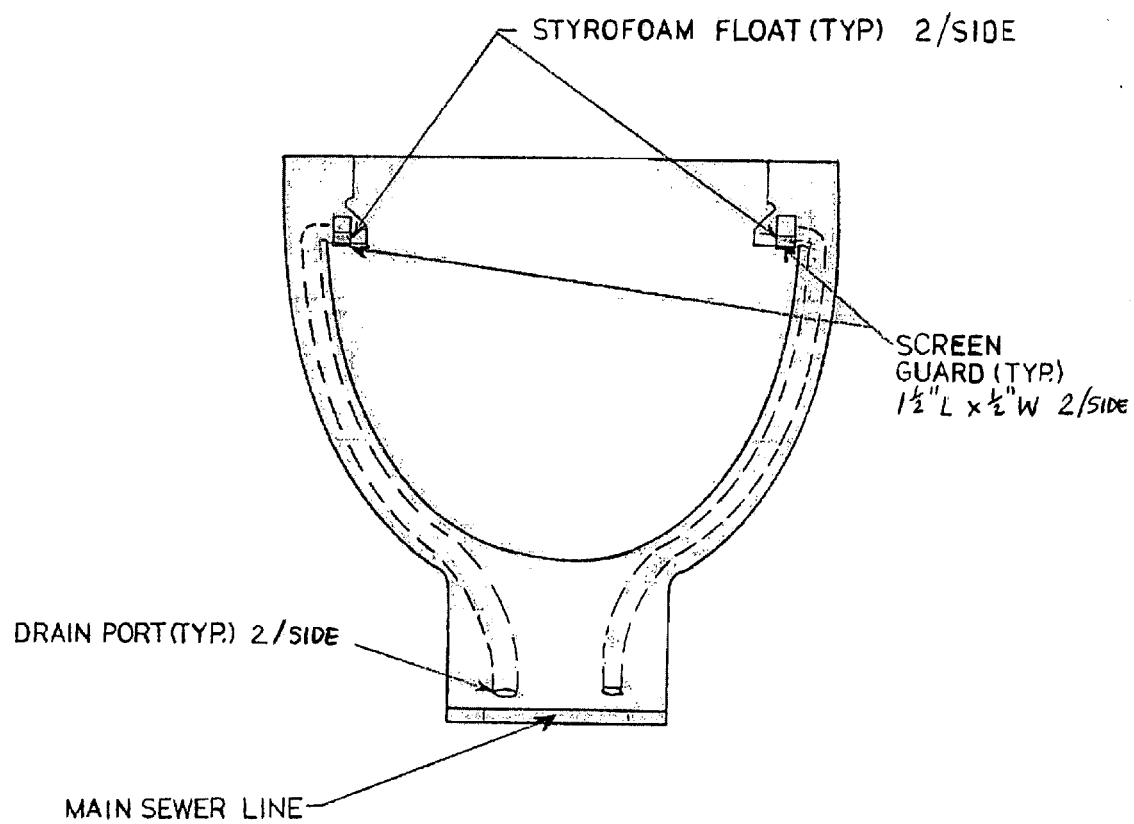

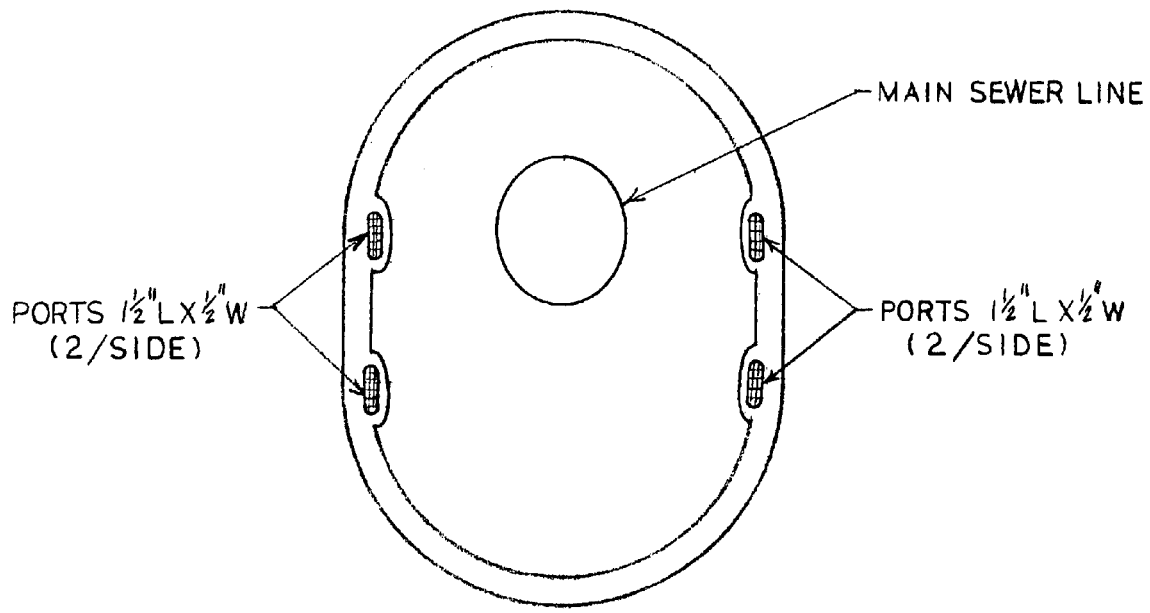
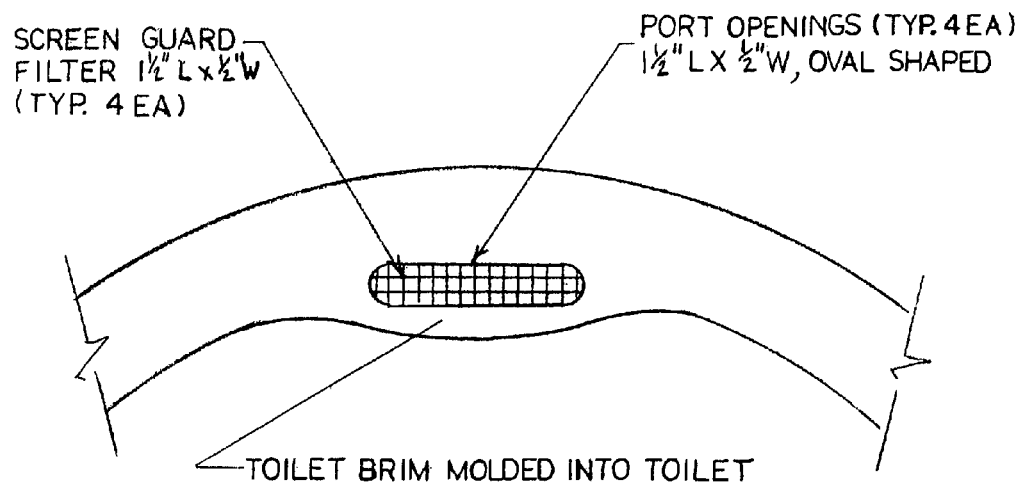

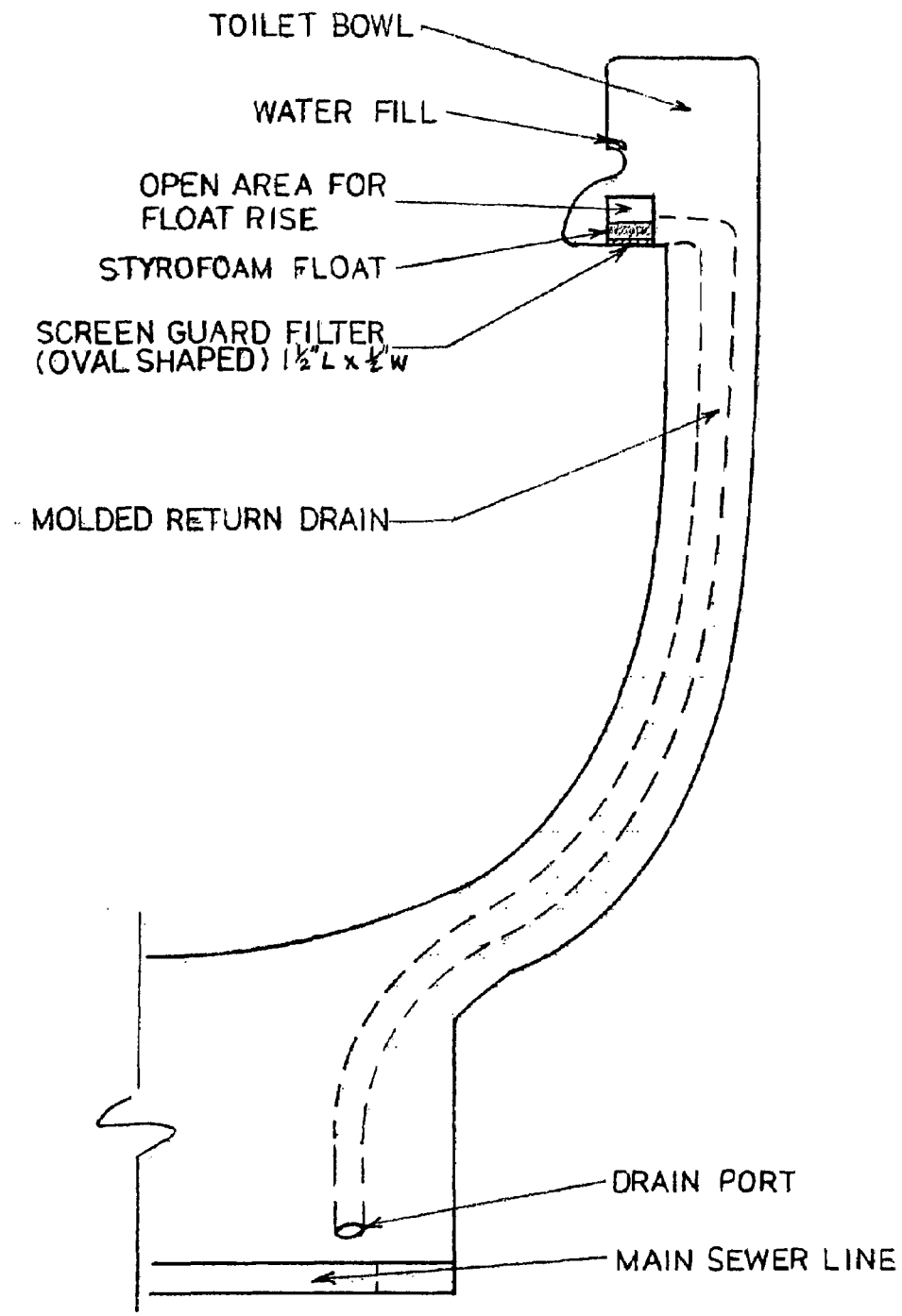

NON-OVERFLOW TOILET BOWL SYSTEM

CROSS REFERENCE TO RELATED APPLICATIONS

This application claims benefit to provisional application 60/587,629, filed on Jul. 13, 2004 entitled "Non-Overflow Toilet Bowl System", which is incorporated by reference herein in its entirety.

FIELD OF THE INVENTION

The present invention discloses a system to keep water from overflowing in a conventional toilet. In particular, the present invention is directed to a toilet system having drain ports and a flotation valve which prevents the toilet from overflowing by allowing water to drain into the return ports and out a return line instead of over the top of the toilet.

BACKGROUND OF THE INVENTION

One of the greatest and messiest of life's inconveniences is a blocked up toilet which floods the bathroom. In addition to the water and smell, disease-bearing fecal matter and urine may cover the floor, thus creating a significant health hazard.

There have been a number of patents directed to toilet overflow control in conventional gravity tank toilet systems. U.S. Patent Publication No. 2003/0196258 discloses an automatic toilet bowl overflow prevention apparatus comprised of a water level sensor attaches to the rim of the toilet bowl, a hollow flexible tube connecting the water level sensor to an air vented toilet tank flapper. When the water level sensor trips, it opens an air valve and allows air to vent out from the air vented toilet tank flapper. Venting the air out of the air vented toilet tank flapper will close the toilet tank flush valve. Thus shutting off water to the toilet bowl and prevents it from overflowing.

U.S. Pat. No. 6,671,893 discloses a system for insertion in a water line to a toilet bowl or urinal includes a housing having a water flow sensor held therein and a toilet or urinal overflow detector held in or formed integrally with the toilet bowl or urinal. The housing includes a normally open valve actuated by the water flow detector or overflow detector to control flow of water through water line. The system may also include a water cleaner cartridge system.

U.S. Pat. No. 6,178,569 discloses a flow control device for a toilet to prevent flooding upon obstructing of a waste outlet of a toilet bowl. The device includes at least one sensor assembly mounted on a rim of a bowl of a toilet or urinal to hold the sensor assembly in a predetermined position within the bowl. If water bridges contacts on the at least one sensor assembly, an electrical circuit is completed, and a solenoid is actuated to close a normally opened valve to shut off running water to the water tank of the toilet. A power source and a valve open alarm system are electrically connected to the at least one sensor assembly and the solenoid actuated valve.

U.S. Pat. No. 4,011,604 discloses an apparatus for controlling the quantity of water flowing through a water outlet in a toilet tank comprising a rotatable shaft having opposed first and second ends disposed through an opening in the front wall of the toilet tank, a crank mounted to the tank, connected to the first end and being capable of rotating the shaft through first and second angles when a force is applied to it, an arm connected to the second end, a box-like structure forming a chamber disposed in the tank and including first and second upwardly extending tubes forming first and second ports, respectively, an upwardly extending overflow tube, and a third port arranged to discharge water through the water outlet, the first tube having an axial dimension that is greater than the second tube, a first flapper valve hingedly connected to the overflow tube and being normally seated on the first port, the first valve being movable from a normally closed position to an open position, a second valve hingedly connected to the overflow tube and being normally seated on the second port, the second valve being movable from a normally closed position to an open position.

U.S. Pat. No. 5,678,252 discloses an environmentally conscious manifold system for a flush tank that conserves water. The system has a flush tank, a box, a first manifold flushing assembly, a second manifold flushing assembly, a flush arm and a compact ballcock assembly. The flush tank has a front wall, a bottom wall, an inside surface and an outside surface. The bottom surface has a conventional tank drain and a water valve disposed therein. The box has a top surface and a bottom surface and is positioned adjacent to the bottom wall on the inside surface of the flush tank. The top surface defines a first hole and a second hole, the bottom surface defines a third hole. The third hole is sealably connected to the flush tank drain. The first manifold flushing assembly has a first trip lever and is attached to the first hole. The second manifold flushing assembly has a second trip lever and is attached to the second hole. The first manifold has a first height and the second manifold has a second height, the first height being greater than the second height. The flush arm has first trip lever and the second trip lever attached thereto. The system needs a compact ballcock assembly, such as Fluidmaster, in order to fit the manifold assembly into the tank. The compact ballcock assembly is attached to the water valve in the flush tank and associated with the second flushing assembly in a conventional manner. Methods for disposing of solid and liquid waste while conserving water, using the current invention are also disclosed.

U.S. Pat. No. 6,385,788 discloses an adjustable diverter device situated in a water tank regulates the water level in the tank. The water enters the device at one end and a flow exits through a first vent into the tank. A second vent is located at the opposite end with an adjustment valve rotatable in the second end. The valve restricts the flow through the second vent and forces a greater amount of water to flow into the water tank.

U.S. Pat. No. 6,671,894 discloses a toilet control system includes a sensor mounted on a bowl of a toilet near a top rim of the bowl and which is connected to a control valve unit which is fluidically interposed between a water supply tank and the bowl of the toilet. The control valve unit is normally open to permit flow of water from the water supply tank to the bowl, but is closed when water is sensed near the rim of the bowl to prevent further flow of water to the bowl from the water supply tank.

While there have been a number of systems for controlling water overflow, none have been entirely effective. It would be desirable provide a system which effectively modifies an existing toilet so as to allow water to exit a drain port and line.

It is an object of the present invention to provide a novel toilet and system for preventing toilet overflow.

It is an object of the present invention to provide a novel toilet system which permits water to flow out specially designed ports.

These and other objects of the present invention will become apparent from the description which follows.

SUMMARY OF THE INVENTION

It is thus an object of the invention to provide a toilet enhancement that will prevent the toilet from overflowing. The toilet enhancement utilizes at least one port molded into the toilet bowl, with a screen guard at the entrance port to allow water only to pass and include a floating valve which in turn would cause the float to rise and allow the water to drain through the drain ports back to the main toilet sewer drain into which it would drain.

In accordance with the present invention, a system for preventing a toilet from overflowing comprising a toilet having at least one outflow port; and a means proximate to a port for opening a valve and permitting water to flow out an escape port when the toilet water reaches a pre-determined level.

A system for preventing a toilet from overflowing: a toilet having at least one outflow port; a flow proximate to a port for opening a valve and permitting water to flow out an escape port when the toilet water reaches a pre-determined level; and a screen over the escape port.

A system for preventing a toilet from overflowing: a toilet having at least one outflow port; and a means proximate to a port for opening a valve and permitting water to flow out an escape port when the toilet water reaches a pre-determined level.

DESCRIPTION OF THE FIGURES

FIG. 1 is a side view of the invention.
FIG. 2 is a top view of the invention.
FIG. 3 is a front section view of the invention.
FIG. 4 is a bottom view of the invention.
FIG. 5 is a side view of the outlet ports of the present invention.

DESCRIPTION OF THE EMBODIMENT

The present invention is described with reference to the enclosed Figures wherein the same numbers are used where applicable. In a broad embodiment the invention is directed to a system which permits a flooding toilet to drain out specially constructed ports.

The present invention is directed to a system which prevents a conventional toilet from overflowing. The invention comprises a conventional toilet 10 having at least one and preferably up to four specially built overflow ports 12. In a preferred embodiment, the ports are covered by a screen FIG. 1 is a side view of molded return drain lines 14 that will carry overflow water back to main sewer line. In a preferred embodiment, the drain port has a length of 1½ inch by a width of ½ and is oval-shaped. The ports 12 are molded into the side of the toilet, stopping just above the main toilet sewer line enabling it to drain into the main sewer line.

Referring to FIG. 2, a bottom view of the 1½ inch long by ½ inch wide oval-shaped ports which will drain overflow water back to the main sewer line 18. The ports 12 are located just below the brim of the toilet water fill two inches by about two (2) inches so that they do not interfere with the operation of the toilet except as used to prevent overflow.

The ports have a screen guard 20 over them to prevent any item other than water to pass through them into the drains. At each port entrance 12a is a float 17 that will have two functions. In its normal position, the floats 17 stay closed to prevent odor from returning from drain. As water rises, the float 17 will rise with the rising water in toilet allowing water to drain into return drain lines 14 back to main sewer line. Therefore, the system prevents the toilet from overflowing. As the water rises above the floats 17, the floats rise and uncover the port and provide a conduit to the sewer line.

FIG. 3 is a front view cut out to illustrate operation of invention showing ports, drains, return lines screen an float operation back to the main sewer line. As shown, the invention comprises a system which permits the rising water to raise the styrofoam. FIG. 4 is a bottom view of port showing dimensions of port 12 that will be located just below the water fill brim two inches.

FIG. 5 is a side view of operation of ports illustrating the full operation of ports and returns. The illustration shows the port with the screen location that will allow water only to flow through. With the rise of the water level, an open cavity space area 24 above the float 17 will provide an area for it to rise, thus allowing water to drain into return back to main sewer line, where water will drain into after the water drains the float.

The present invention functions to permit rising water to flow out the ports, not over the top of the toilet. The present invention has been described with reference to the preferred embodiment described above. It is to be appreciated that the true nature and scope of the present invention is to be determined with reference to the attached claims.

The invention claimed is:

1. A system for preventing a toilet from overflowing comprising: a toilet bowl having at least one overflow port situated above the normal water level of the toilet; at least one drain line adapted to be connected to a main sewer line; and at least one floatable valve covering the overflow port and opening the overflow port when the toilet water level rises above the valve so as to permit water flow to the drain line when the water reaches a pre-determined level.

2. A system for preventing a toilet from overflowing comprising: a toilet bowl having a plurality of overflow ports; a plurality of drain lines adapted to be connected to a main sewer line; a plurality of floatable valves, each floatable valve covering each overflow port for opening the overflow port and permitting water to flow out the overflow port to the drain line when the toilet water reaches a pre-determined level; and a plurality of screens, each screen covering over each overflow port.

3. A system for preventing a toilet from overflowing comprising: a toilet bowl having a plurality of overflow ports situated above the normal water level of the toilet, each overflow port having a vertically extending cavity; a plurality of drain lines adapted to be connected to a main sewer line; a plurality of floatable valves, each floatable valve covering each overflow port and opening by floating upward into the cavity when the toilet water level rises above the valve so as to permit water to flow out the port to the drain line when the toilet water reaches a pre-determined level; and a plurality of protective screens, each screen covering over each overflow port.

* * * * *